United States Patent
Greenwood

(10) Patent No.: US 6,312,356 B1
(45) Date of Patent: Nov. 6, 2001

(54) DRIVE MECHANISM FOR INFINITELY VARIABLE TRANSMISSION

(75) Inventor: Christopher John Greenwood, Preston (GB)

(73) Assignee: Torotrak (Development) Limited, Lancashire (GB)

( * ) Notice: Subject to any disclaimer, the term of this patent is extended or adjusted under 35 U.S.C. 154(b) by 0 days.

(21) Appl. No.: 09/597,996

(22) Filed: Jun. 19, 2000

Related U.S. Application Data

(63) Continuation of application No. PCT/GB98/03734, filed on Dec. 14, 1998.

(30) Foreign Application Priority Data

Dec. 24, 1997 (GB) .................................... 9727295

(51) Int. Cl.$^7$ .................................................. F16H 15/38
(52) U.S. Cl. ................................................ 476/40; 476/41
(58) Field of Search .................. 476/39, 40, 41, 476/42, 45

(56) References Cited

U.S. PATENT DOCUMENTS

| 2,152,796 | * | 4/1939 | Erban ..................................... 476/42 |
| 2,157,066 |   | 5/1939 | Madle . |
| 2,984,118 | * | 5/1961 | De Brie Perry ........................ 476/42 |
| 3,087,348 | * | 4/1963 | Kraus ..................................... 476/45 |
| 5,368,529 |   | 11/1994 | Machida . |

FOREIGN PATENT DOCUMENTS

| 0 420 157 | 4/1991 | (EP) . |
| 2 643 123 | 8/1990 | (FR) . |
| 431199 | 10/1934 | (GB) . |
| A-436 363 | 10/1935 | (GB) . |

* cited by examiner

Primary Examiner—David A. Bucci
Assistant Examiner—William C Joyce
(74) Attorney, Agent, or Firm—Nixon & Vanderhye P.C.

(57) ABSTRACT

A drive mechanism for an infinitely-variable-transmission in which a relatively flexible member 32 connects one or other of the discs 14 to the shaft 10, thereby to accommodate a degree of shaft flexing without distortion of the toroidal cavity.

20 Claims, 4 Drawing Sheets

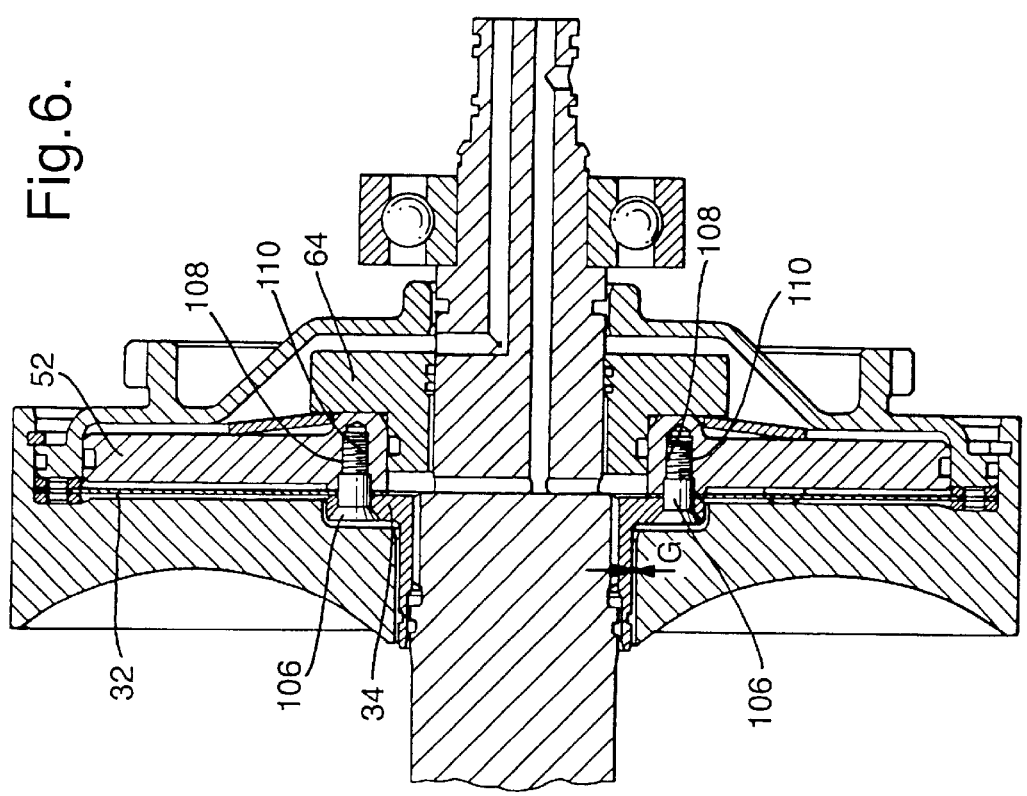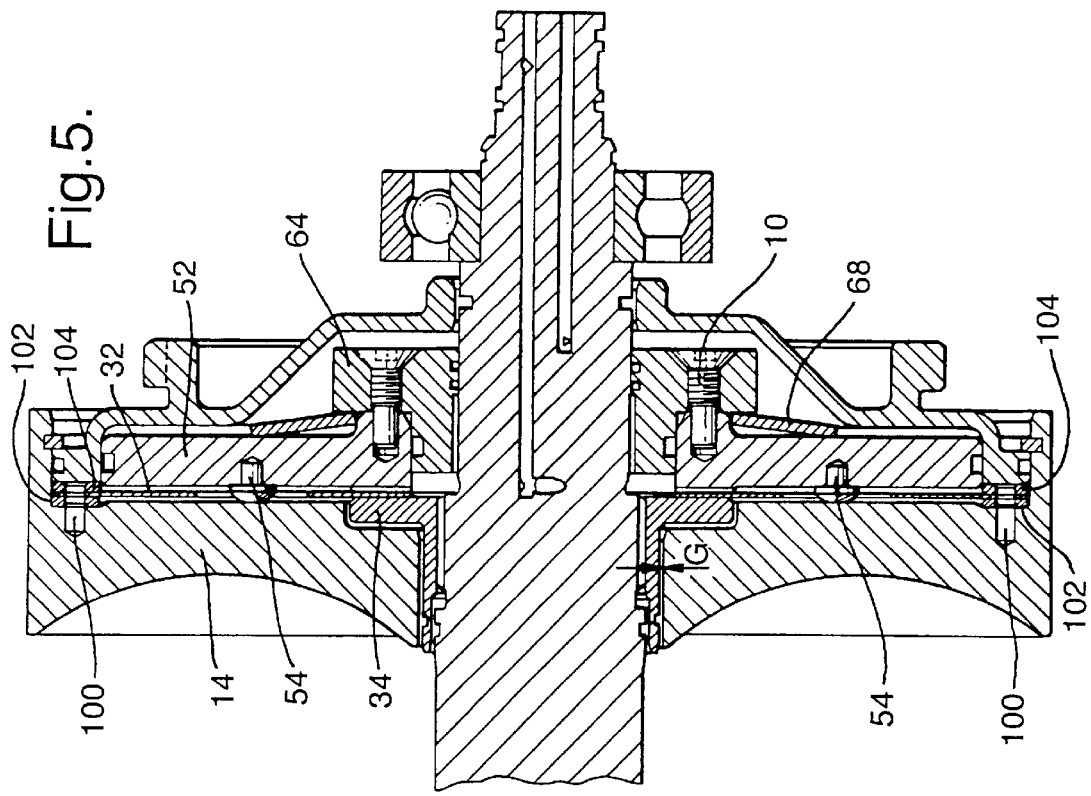

DRIVE MECHANISM FOR INFINITELY VARIABLE TRANSMISSION

This is a continuation of PCT application PCT/GB98/03734, filed Dec. 14, 1998, the entire content of which is hereby incorporated by reference in this application.

SUMMARY OF THE INVENTION

1. Field of the Invention

The present invention relates to infinitely-variable-ratio transmission apparatus of the toroidal race rolling friction type, hereinafter referred to as a variator.

2. Discussion of Prior Art

In such apparatus there is employed a main shaft which takes drive from, for example, an engine e.g. an internal combustion engine to two input discs which are mounted on the shaft. Two output discs are mounted back to back between the input discs and are free to rotate relative to the shaft.

In such an arrangement motion is transferred from the input discs to the output discs via a plurality of rollers positioned in toroidal cavities which are provided between the input discs and the output discs.

Single cavity variators are also known in which a single input disc is mounted for rotation on an input shaft and a single output disc faces the input disc in a manner which defines a toroidal cavity in which are situated a plurality of power-transmitting rollers. Whilst such an arrangement is less likely to suffer from the problems outlined herein, it will be appreciated that the present invention can be applied to this single cavity arrangement.

The rollers are subjected to hydraulic forces by an end load device so that they make contact with the faces of the respective input and output discs in order to transmit power from the input discs to the output discs. The power is transferred from the output discs via, for example, a chain drive to a further transmission component such as an epicyclic gear box.

The drive through the chain exerts a transverse load onto the shaft and at high power transmission levels can cause the shaft to flex. The degree of flexing is relatively small but has the potential of causing a significant effect on the position of the two output discs which can cause the load on some of the rollers to be increased i.e. a crushing effect will be applied, whilst the load on some of the remaining rollers will be decreased, thereby not allowing the drive to be transferred efficiently from the input to the output discs.

It will be appreciated that the effect of shaft flexing is in effect a distortion of the toroidal cavities between the input and output discs.

A solution to the above problem can be summarised as accepting a relatively small degree of flexing of the shaft and then providing some compliance in the mounting of the discs such that when the shaft is subjected to flexing the discs are able to rotate in planes which are parallel to one another, and thereby maintain the shape of the cavities.

GB-A436363 discloses a variable speed power transmission mechanism having torus discs and rollers in which one of the discs is mounted on a support shaft by means of one or more teeth or dogs on a front face which engage with a collar keyed to the central shaft. Such an arrangement does provide some degree of relative movement between the disc and shaft but improvement on this design is possible.

SUMMARY OF THE INVENTION

The present invention seeks to provide a transmission apparatus in which one or more of the discs is mounted on the shaft in such a manner that it rotates with the shaft but is capable of adopting a plane of rotation which is other than normal.

Accordingly the present invention provides a variator transmission apparatus comprising an input shaft, one or more input discs mounted on the shaft for rotation therewith, an output disc assembly, the input disc or discs and the output disc assembly defining between them one or more toroidal cavities, a plurality of rollers located in the cavity or cavities and means for applying an end load pressure to maintain the rollers in contact with the respective disc or discs in order to transmit drive, characterised in that one of the discs is mounted on the shaft by means of an intermediate relatively flexible member.

The relatively flexible member can be attached to a sleeve at an inner radial location and the sleeve is attached to the shaft so as to be rotatable therewith.

For example the sleeve can be splined so that it is rotatable with the shaft and axially moveable relative to the shaft.

The relatively flexible member can be attached to the sleeve by means of a clamping ring.

The flexible member can be attached at an outer radial location to a clutch ring.

The clutch ring can be provided with projections which are engageable with corresponding recesses on the said disc; alternatively the disc may be provided with projections which are engageable with corresponding recesses on the clutch ring.

The relatively flexible member can be secured at the said outer radial location by means of an outer clamping ring.

A reaction plate can be mounted on the shaft, the reaction plate having two or more sets of pins, one of which said sets of pins being extendable through clearance openings in the flexible member in order to contact a face of the said one of the discs, the pins of one of the other said sets of pins engaging the relatively flexible member at an inner radial location.

The apparatus can include a clamping nut assembly which is threadedly mounted on the shaft in order to force the reaction plate into contact with the said one of the discs by means of the respective one of the said sets of pins.

The other one of said discs can be mounted for rotation with the shaft, and be provided with abutment means to prevent axial movement The output disc assembly can be mounted on bearing means which have part spherical co-operating surfaces thereby allowing the disc assembly to rotate relative to the shaft and to adopt a plane of rotation other than normal relative to the shaft.

In a development of the above, the flexible member may also be secured to the reaction plate of the end load mechanism.

In the above development the flexible member may be secured to the reaction plate and the sleeve by means of a bolt arrangement or a rivet arrangement.

In either arrangement, the flexible member may be secured to the disc by means of a bolt or rivet arrangement.

In a still further development, the flexible member in either arrangement may be preshaped or pre-loaded such that upon application of the end load it is substantially perpendicular to the axis of said shaft.

BRIEF DESCRIPTION OF THE DRAWINGS

The present invention will now be more particularly described with reference to the accompanying drawings in which.

FIGS. 5 and 6 are sectional views of an alternative form of the present invention.

DETAILED DISCUSSION OF PREFERRED EMBODIMENTS

Figure 1:
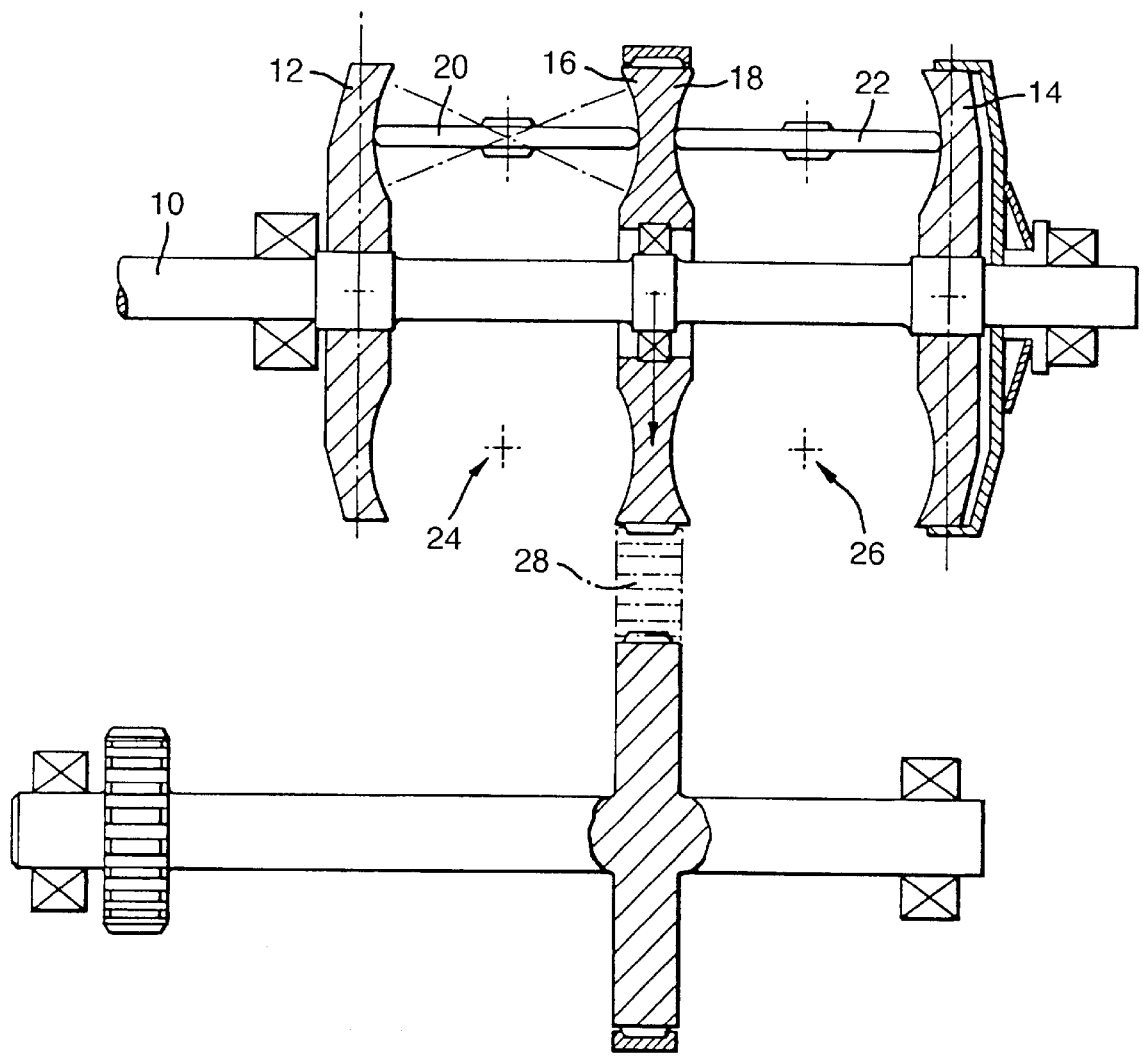
FIG. 1 shows a diagrammatic representation of a infinitely-variable-ratio transmission apparatus of the type to which the present invention can be applied.

Referring to the drawings there is shown a infinitely-variable-ratio transmission apparatus a variator which comprises an input shaft 10, two input discs 12, 14, two output discs 16, 18, two sets of rollers 20, 22 which are located in toroidal cavities 24, 26 which are formed between the input and output discs, and a chain drive 28 which is mounted on the two output discs 16, 18.

The two inputs discs 12, 14 are mounted for rotation with the shaft 10 e.g. by means of splined mountings, whilst the output discs 16, 18 are free to rotate relative to the shaft 10.

The input disc 14 has limited axial movement and the disc 12 is prevented by an abutment not shown on the shaft 10 from moving axially on the shaft.

The disc 14 is subjected to a load operating towards the left as shown in FIG. 1 e.g. by means of hydraulic pressure so that the sets of rollers 20, 22 are maintained in contact with the toroidal surfaces of the input and output discs, thereby allowing drive to be transmitted from a power source e.g. an internal combustion engine via the chain drive 28 to a further component of a vehicle transmission e.g. an epicyclic gearbox not shown.

It will be appreciated that the chain drive 28 may exert a bending load on the shaft 10 and therefore there may be a distortion in the shape of the toroidal cavities 24, 26. It will thus be appreciated that the load on some of the rollers 20, 22 will be increased whilst the load on the remaining rollers can be decreased.

The increase in load on some of the rollers may be unacceptable in that unduly high stresses are caused within the rollers, whilst the decrease in load on the remaining rollers is likely to reduce the efficiency of the drive between the input and output discs because slipping may occur between the input and output discs.

In order to prevent or substantially reduce the effect of the distortion of the shapes of the toroidal cavities 24, 26 which can be produced by a bending load being applied to the shaft 10, the present invention proposes a design which allows the input and output discs to adopt planes of rotation which are and remain substantially parallel to one another when flexing occurs.

Figure 2:
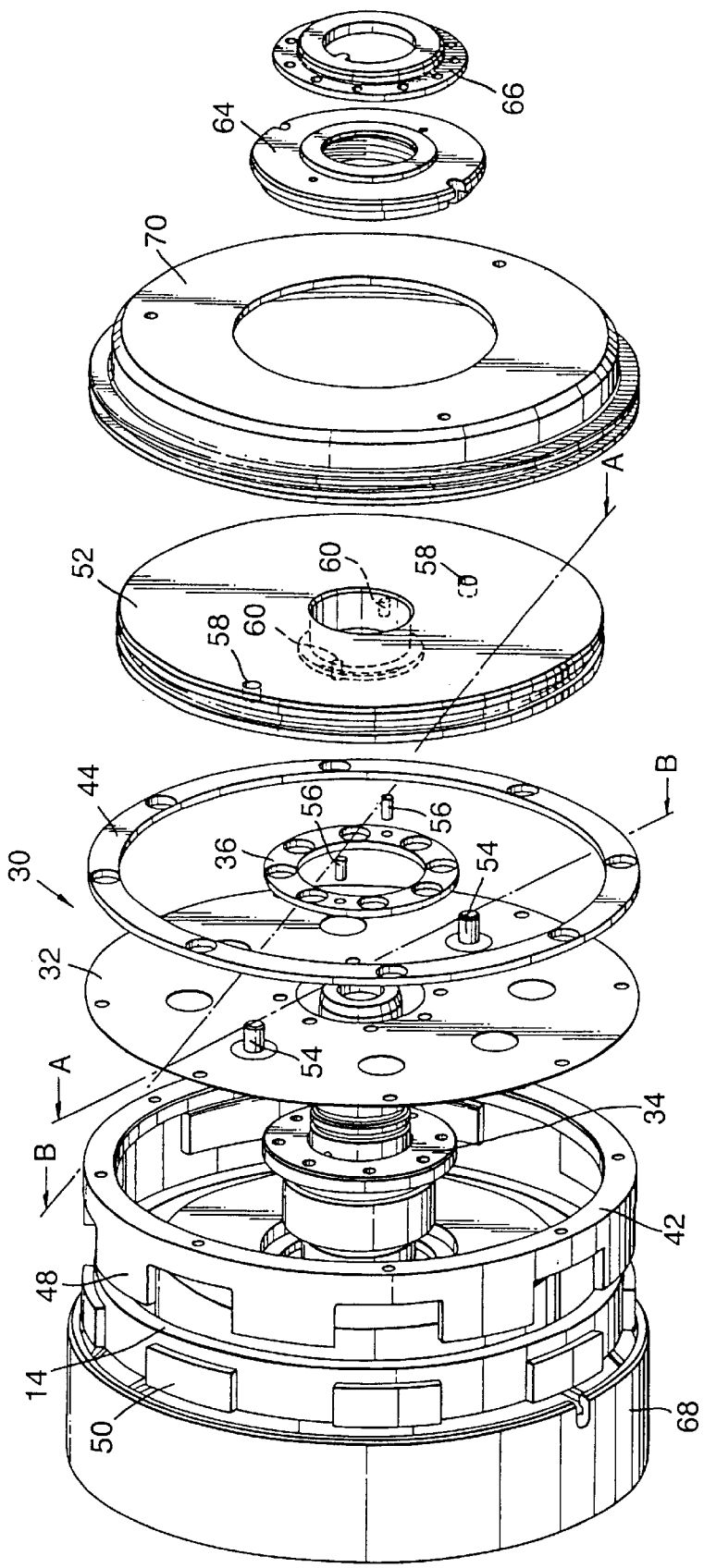
FIG. 2 shows an exploded view of one form of disc assembly according to the present invention.
Figure 4:
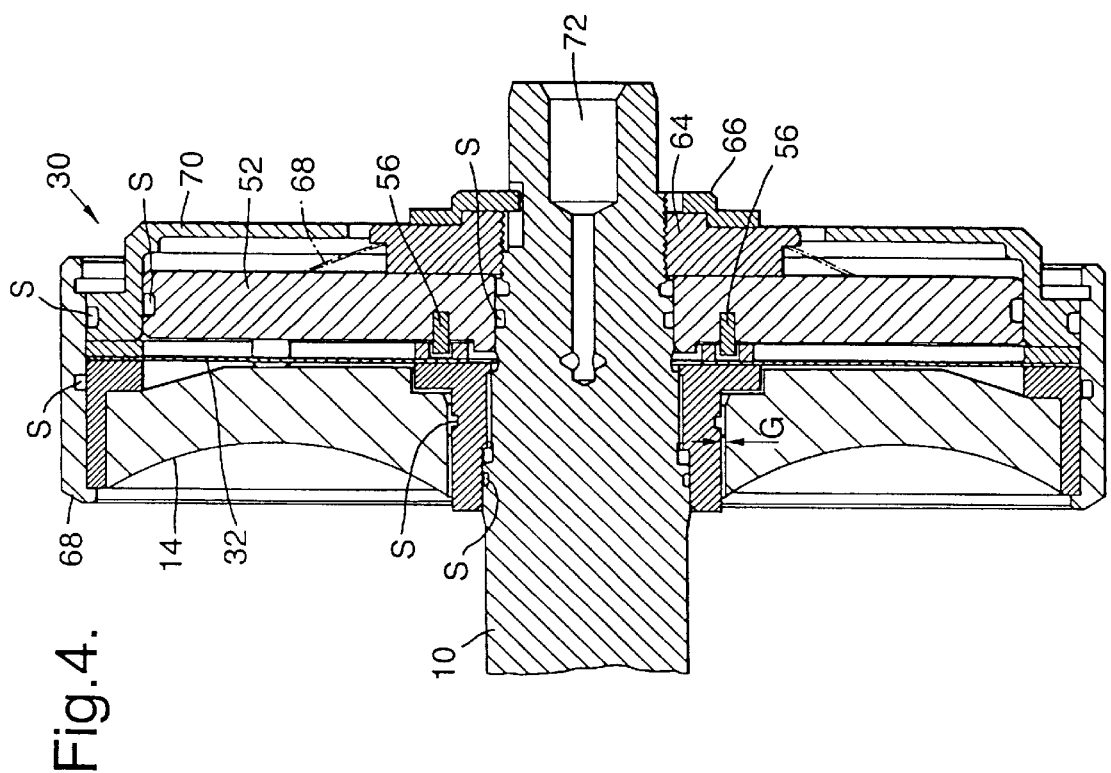
FIG. 4 is a section on line B—B of FIG. 2.
Figure 3:
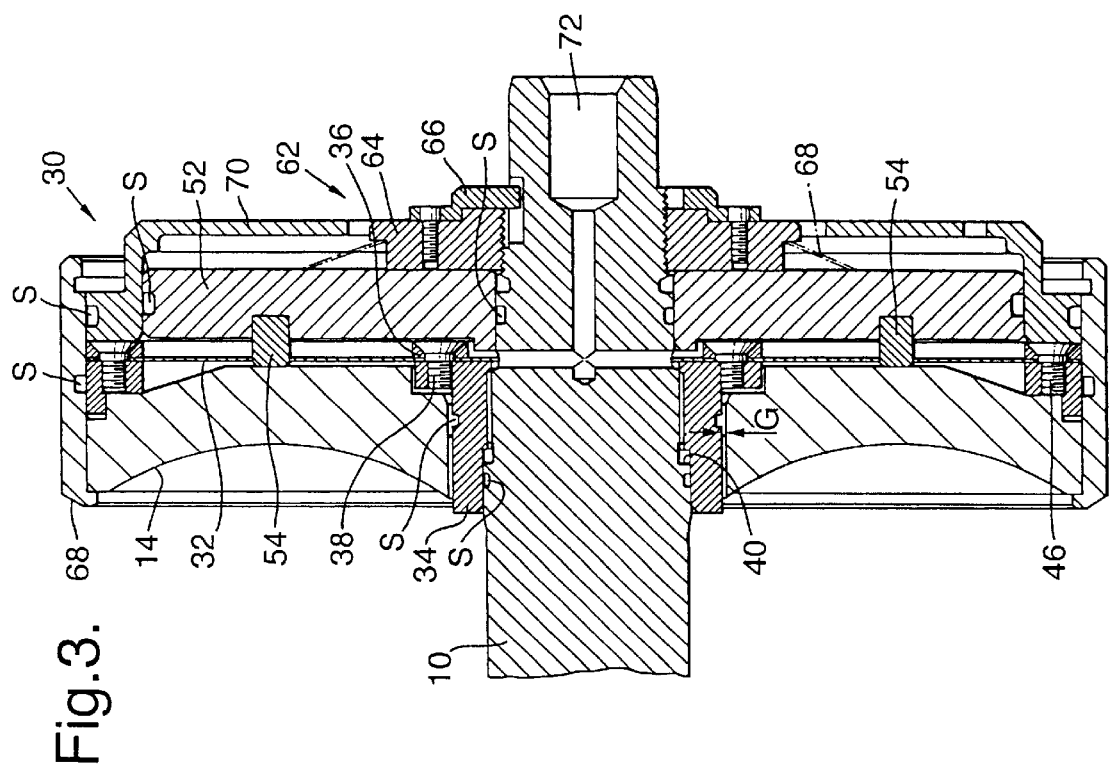
FIG. 3 is a section on line A—A of FIG. 2.

Referring to FIGS. 2, 3 and 4, there is shown an assembly 30 which allows the disc 14 to be mounted for rotation with the shaft 10 in order to transmit drive but also to allow the plane of rotation of the disc to be other than normal, i.e. perpendicular, to the shaft 10.

The assembly 30 comprises a relatively flexible member e.g. a diaphragm 32 which is attached at an inner radial location to a splined sleeve 34 by means of a clamping ring 36 and screws 38, the splined sleeve 34 extending through a clearance bore in the centre of the disc 14. The relatively flexible member is, in this particular arrangement, made as a pressing from a sheet of spring steel (for example, spring steel to BS 1449: CS80). Other suitable alternatives will, however, present themselves to persons skilled in the art.

The sleeve 34 is axially moveable on splines formed on the shaft 10 and axial movement of the sleeve 34 is limited by means of a shoulder 40 formed on the shaft 10. A gap G, as shown in FIGS. 3 to 6, is provided between the disc and the shaft, thereby to accommodate the desired relative movement.

At an outer radial location the diaphragm 32 is attached to a clutch ring 42 by means of a clamping ring 44 and screws 46.

The clutch ring 42 is formed on its circumference with rectangular teeth 48 which are engageable between corresponding teeth 50 which are provided on the circumference of the disc 14 e.g. in the manner of a dog clutch. The engagement of the teeth 48 and the teeth 50 enables drive to be transmitted from the diaphragm 32 to the disc 14, and also locates the disc 14 with respect to the shaft 10. It will, of course, be appreciated that the disc may be provided with projections which are engageable with corresponding recesses on the clutch ring.

A circular reaction plate 52 is mounted on the shaft 10 and carries two sets of pins 54, 56 the pins being mounted in countersunk holes 58, 60 respectively in the plate 52. Each set comprises two pins, but more pins can be used if required.

The assembly 30 is pre-loaded by means of a nut sub-assembly 62 which comprises a nut 64 and a locking plate 66 which is bolted to the nut 64.

A Belleville washer 68 is located between the nut 64 and the plate 52.

Rotation of the nut 64 applies pressure via the Belleville washer 68 to the plate 52 and the pins 56 engage with openings in the clamping ring 36, so that the plate 52 rotates with the diaphragm 32.

At the same time the pins 54 which pass through clearance openings in the diaphragm 32 contact the rear face of the disc 14.

Once the assembly has been so pre-loaded the clamping ring 66 is secured in position to prevent rotation of the nut 64.

It will be appreciated that the disc 14 is pre-loaded so that the rollers 22 in the cavity 26 contact both the input disc 14 and the output disc 18.

It will also be appreciated that since the teeth 48 of the clutch ring 42 are in engagement with the teeth 50 on the outer circumferential surface of the disc 14, drive can be transmitted from the shaft 10 to the disc 14.

The assembly 30 also includes a housing 68 and an end cap 70, which is held in position by means, not shown.

The shaft 10 includes an inlet 72 to allow hydraulic pressure to be applied to the space defined by the rear face of the disc 14 and the front face of the plate 52. The diaphragm 32 is provided with openings so that hydraulic fluid can fill this space. The applied hydraulic load forces the sleeve 34 into contact with the abutment 40 so that a clearance exists between the disc 14 and the diaphragm 32.

The assembly is provided with seals S in order to contain the hydraulic fluid within the desired volume.

It will thus be understood that when the shaft 10 is subjected to flexing the relatively flexible diaphragm 32 can flex as the disc 14 rotates, thereby allowing drive to be transmitted continuously from the shaft 10 to the disc 14 but also to maintain the shape of the toroidal cavity 26.

In addition to the disc 14 being so mounted, the disc 12 can be mounted in a conventional manner e.g. by a splined arrangement and a stop to prevent the disc 12 from moving too far to the left as shown in FIG. 1 so that when the shaft 10 is subjected to flexing the plane of the disc 12 will remain normal to the axis of rotation of the shaft 10. Clearly, one could mount disc 12 in the same manner as that described in relation to disc 14.

Compliance can be provided for the output discs 16, 18 by mounting the discs on a bearing in which the co-operating surfaces are part spherical, thereby allowing the output discs 16, 18 to adopt a plane of rotation which is other than normal to the axis of rotation of the shaft 10.

It will be appreciated that the above arrangement may be reversed such that the input discs 12, 14 become output discs and the output discs become input discs. Further to this, it will also be appreciated that the present invention may be employed on a single cavity variator in which the bearing supports are such that shaft flexing is a possibility. It will be still further appreciated that when a dual cavity variator is employed, one might provide a flex drive to both output and input discs if so desired.

An alternative to the above is shown in FIGS. 5 and 6 which are each cross-sectional views taken at slightly different angles so as to illustrate fully the components of the flex drive. In this arrangement, like components have been given the same reference numbers as in FIGS. 3 and 4 and are not necessarily mentioned further herein.

In the alternative arrangement, disc 14 is still mounted by means of a relatively flexible member 32 but this member is secured in a somewhat different manner. For example, the outer ends of the member are secured to the disc by means of blind rivets 100 which act to secure the member 32 between a pair of clamp rings 102, 104 and to the disc 14. A plurality of such rivets are circumferentially spaced around the outer circumference of the member 32 and collectively provide sufficient strength to ensure the transmission of torque across the connection. The inner end of member 32 is once again secured to splined sleeve 34 but this is also secured to the reaction plate 52. In the specific example a plurality of bolts 106 extend through the sleeve 34, the flexible member 32 and into the reaction plate 52 in which are provided threaded portions 103 for receiving a matching thread 110 on the bolts 106. A reverse arrangement may be used in which the bolts pass through the reaction plate and are screw threadably engaged in the sleeve 34. In a preferred arrangement, the flexible member pre-shaped or pre-loaded such that upon application of the end load it adopts a position which is substantially perpendicular to the shaft and only deviates from this if the shaft is subjected to flexing. In effect, the arrangement is such that, at rest, the central portion of the flexible member of FIG. 5 and the sleeve 34 are displaced towards the cavity by an amount equal to that by which the disc 14 will be moved once the hydraulic end load is applied. The arrangement of FIG. 5 is shown in the position associated with full hydraulic end load and the reaction plate 52 is shown displaced away from the disc 14 such that it abuts up against the locking nut 64. Before the hydraulic end load is applied the spring 68 acts to load the disc and in doing so creates a small gap not shown between the reaction plate and the locking nut 64. It is this gap which accommodates the movement required when the hydraulic end load is applied.

What is claimed is:

1. A variator transmission apparatus comprising an input shaft (10), one or more input discs (12, 14) mounted on the shaft (10) for rotation therewith, an output disc assembly (16, 18), the input disc or discs (12, 14) and the output disc assembly (16, 18) defining between them one or more toroidal cavities (24, 26), a plurality of rollers (20, 22) located in the cavity or cavities (24, 26) and means for applying an end load pressure to maintain the rollers in contact with the respective disc or discs (12, 14, 16, 18) in order to transmit drive, at least one of the discs (12, 14, 16, 18) is mounted on the shaft by an intermediate relatively flexible member (32) permitting limited axial and pivotal movement without radial movement.

2. An apparatus as claimed in claim 1 in which one of said discs (12) is mounted for rotation with the shaft (10), and includes abutment means to prevent axial movement.

3. An apparatus as claimed in claim 1 in which the flexible member (32) is secured to the disc (14) by means of a bolt (46) or rivet arrangement.

4. An apparatus as claimed in claim 1 in which the flexible member is pre-shaped or pre-loaded such that upon application of the end load it is substantially perpendicular to the axis of said shaft.

5. An apparatus as claimed in claim 1 in which the variator comprises two input discs and two output discs, said output discs being positioned back-to-back and being sandwiched between the two input discs.

6. An apparatus as claimed in claim 1 in which the variator comprises two input discs and two output discs, said input discs being positioned back-to-back and being sandwiched between the two output discs.

7. An apparatus as claimed in claim 1 in which the relatively flexible member is attached to a sleeve at an inner radial location and the sleeve is attached to the shaft so as to be rotatable therewith.

8. An apparatus as claimed in claim 1 in which the flexible member is attached at an outer radial location to a clutch ring.

9. An apparatus as claimed in claim 1 in which the relatively flexible member is secured at an outer radial location by means of an outer clamping ring.

10. An apparatus as claimed in claim 1 and further including a reaction plate mounted on the shaft, the reaction plate having two or more sets of pins, one of said sets of pins extending through clearance openings in the flexible member in order to contact a face of one of the discs, the pins of another of said sets of pins engaging the relatively flexible member at an inner radial location.

11. A variator transmission apparatus comprising an input shaft, one or more input discs mounted on the shaft for rotation therewith, an output disc assembly, the input disc or discs and the output disc assembly defining between them one or more toroidal cavities, a plurality of rollers located in the cavity or cavities and means for applying an end load pressure to maintain the rollers in contact with the respective disc or discs in order to transmit drive, characterised in that one of the discs is mounted on the shaft by means of an intermediate relatively flexible member in which the relatively flexible member (32) is attached to a sleeve (34) at an inner radial location and the sleeve (34) is attached to the shaft (10) so as to be rotatable therewith.

12. An apparatus as claimed in claim 11 in which the sleeve (34) is splined so that it is rotatable with the shaft (10) and axially moveable relative to the shaft (10).

13. An apparatus as claimed in claim 11 in which the relatively flexible member (32) is attached to the sleeve (34) by a clamping ring (36).

14. A variator transmission apparatus comprising an input shaft, one or more input discs mounted on the shaft for rotation therewith, an output disc assembly, the input disc or discs and the output disc assembly defining between them one or more toroidal cavities, a plurality of rollers located in the cavity or cavities and means for applying an end load pressure to maintain the rollers in contact with the respective disc or discs in order to transmit drive, characterised in that one of the discs is mounted on the shaft by means of an intermediate relatively flexible member, in which the flexible member (32) is attached at an outer radial location to a clutch ring (42).

15. An apparatus as claimed in claim 14 in which the clutch ring (42) includes projections (48) and the disc includes corresponding recesses such that the projections are engageable in corresponding recesses on the said disc.

16. A variator transmission apparatus comprising an input shaft, one or more input discs mounted on the shaft for rotation therewith, an output disc assembly, the input disc or discs and the output disc assembly defining between them one or more toroidal cavities, a plurality of rollers located in the cavity or cavities and means for applying an end load pressure to maintain the rollers in contact with the respective disc or discs in order to transmit drive, characterised in that one of the discs is mounted on the shaft by means of an intermediate relatively flexible member in which the relatively flexible member (32) is secured at an outer radial location by means of an outer clamping ring (44).

17. A variator transmission apparatus comprising an input shaft, one or more input discs mounted on the shaft for rotation therewith, an output disc assembly, the input disc or discs and the output disc assembly defining between them one or more toroidal cavities, a plurality of rollers located in the cavity or cavities and means for applying an end load pressure to maintain the rollers in contact with the respective disc or discs in order to transmit drive, characterised in that one of the discs is mounted on the shaft by means of an intermediate relatively flexible member and further including a reaction plate (52) mounted on the shaft (10), the reaction plate (52) having two or more sets of pins (54, 56), one of said sets of pins (54) extending through clearance openings in the flexible member in order to contact a face of one of the discs (14), the pins of another of said sets of pins (56) engaging the relatively flexible member (32) at an inner radial location.

18. An apparatus as claimed in claim 17 and further including a clamping nut assembly (64) which is threadedly mounted on the shaft (10) in order to force the reaction plate (52) into contact with the said one of the discs (14) by means of the respective one of the said sets of pins (54, 56).

19. An apparatus as claimed in claim 17 in which the flexible member (32) is secured to the reaction plate (52).

20. An apparatus as claimed in claim 19 in which the flexible member (32) is secured to the reaction plate (52) and a sleeve by means of a bolt arrangement (106) or rivet arrangement.

\* \* \* \* \*